United States Patent [19]

Brady

[11] 3,862,939

[45] Jan. 28, 1975

[54] 3-(3-CHLORO-2-PROPENYL)-1,3,5,7-TETRAAZABICYCLO(3.3.1) NONANE-3-METHANOL AND ITS PREPARATION

[75] Inventor: Thomas P. Brady, Natick, Mass.

[73] Assignee: The Dow Chemical Company, Midland, Mich.

[22] Filed: Oct. 23, 1973

[21] Appl. No.: 408,889

[52] U.S. Cl.............................. 260/248 NS, 424/249
[51] Int. Cl.............................................. C07d 55/14
[58] Field of Search............................... 260/248 NS

[56] References Cited
UNITED STATES PATENTS 3,228,829  1/1966  Wolf et al....................... 260/248 X Primary Examiner—John M. Ford
Attorney, Agent, or Firm—Theodore Post; C. Kenneth Bjork

[57] ABSTRACT

7-Cis- or 7-cis-trans-(3-Chloro-2-propenyl)-1,3,5,7-tetraazabicyclo(3.3.1)nonane-3-methanol is prepared by reacting cis-, or cis-trans- 7-(3-chloro-2-propenyl)-3,5,7-triaza-1-azoniatricyclo(3.3.1.1$^{3,7}$)decane chloride with excess aqueous strong base at room temperature to give the corresponding carbinolamine, 7-(3-chloro-2-propenyl)-1,3,5,7-tetraazabicyclo(3.3.1)nonane-3-methanol.

4 Claims, No Drawings

3-(3-CHLORO-2-PROPENYL)-1,3,5,7-TETRAAZABICYCLO(3.3.1) NONANE-3-METHANOL AND ITS PREPARATION

BACKGROUND OF THE INVENTION

The art describes the conversion of N-methyl hexamethylene tetramine salts to form in low yields the N-methyl hexamethylene tetramine hydroxide; U.S. Pat. No. 1,336,709, Apr. 13, 1920 and Foss et al., J. Chem. Soc., 1950, 624. Neither reference shows any utility for the resulting hydroxide. In the first reference, a solution of barium hydroxide is used to react with the N-methyl hexamethylenetetramine salt, while in the second reference, moist silver oxide is used.

SUMMARY OF THE INVENTION

This invention concerns the novel compounds 7-cis- and 7-cis-trans-(3-chloro-2-propenyl)-1,3,5,7-tetraazabicyclo(3.3.1)nonane-3-methanol, hereinafter referred to as "Carbinolamine" or "Carbinolamines." The Carbinolamines are prepared by reacting cis-1-(3-chloro-2-propenyl)-3,5,7-triaza-1azoniatricyclo(3.3.1.1$^{3,7}$)decane chloride, commercially available as Dowicil 200 or cis-trans-1-(3-chloro-2-propenyl)-3,5,7-triaza-1-azoniatricyclo(3.3.1.1$^{3,7}$)-decane chloride, commercially available as Dowicil 100, with excess aqueous strong base, e.g., an alkali metal hydroxide such as sodium hydroxide or potassium hydroxide or other strong water-soluble base at substantially room temperature, i.e., at or slightly below 25°C., according to the following equation

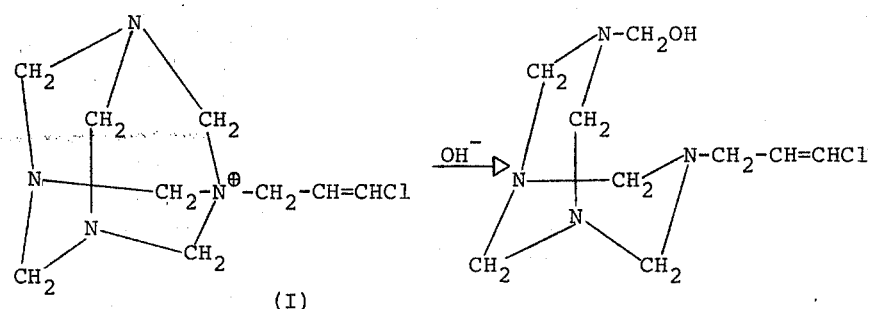

In the reaction, up to about 5 moles of base per mole of starting cis- or cis-trans- compound (I) are used, and preferably from about 2 to about 5 moles of base per mole of starting cis- or cis-trans- compound. The Carbinolamine product is extracted from the reaction medium with a water-immiscible organic solvent, such as methylene chloride or benzene, to give in high yield the Carbinolamines as high boiling viscous oils, slightly immiscible with water but highly soluble in organic solvents such as aromatic solvents, chlorinated hydrocarbons, ethers, alcohols and ketones. The structures of the Carbinolamines are confirmed by proton and C$^{13}$ nuclear magnetic resonance spectra, and by mass spectrometry.

DESCRIPTION OF THE EMBODIMENTS

The following examples and teachings additionally describe specific embodiments and the best mode contemplated by the inventor of carrying out the invention.

EXAMPLE 1

50.0 Grams of cis-1-(3-chloro-2-propenyl)-3,5,7-triaza-1-azoniatricyclo(3.3.1.1$^{3,7}$)decane chloride (0.2 mole) was added gradually to a solution of 16.0 grams NaOH (0.4 mole) in 100 ml. of H$_2$O and the reaction mixture stirred about 15 minutes at room temperature. The oily aqueous reaction mixture was extracted twice with 200 ml. portions of CH$_2$Cl$_2$ and the phases allowed to separate. The CH$_2$Cl$_2$ phases were drawn off in a separatory funnel and dried with molecular sieves. The CH$_2$Cl$_2$ was removed in vacuo, 40°/20 mm. mercury, to give 36.0 grams of product cis-Carbinolamine.

EXAMPLE 2

100 Grams (0.4 mole) of cis-1-(3-chloro-2-propenyl)-3,5,7-triaza-1-azoniatricyclo(3.3.1.1$^{3,7}$)decane chloride was added slowly to a solution of 80 grams (2.0 mole) NaOH dissolved in 500 ml. H$_2$O and the reaction mixture stirred 15 minutes at room temperature. Product cis-Carbinolamine was extracted with benzene, dried over Na$_2$SO$_4$ and the benzene evaporated to give 72 grams (78% yield) at a viscous oil, cis-Carbinolamine.

The procedures of Example 1 and 2 when repeated with Dowicil 100 give cis-trans- Carbinolamine product.

The Carbinolamines of this invention have antimicrobial activity. In representative operations, both the cis- and the cis-trans- Carbinolamines when tested for antimicrobial activity using conventional agar dilution tests give complete growth inhibition against *Staphylococcus aureus* and *Aerobacter aerogenes* at a concentration of 50 p.p.m. and against *Pseudomonas aeruginosa* at 75 p.p.m.

What is claimed is:

1. A member of the group consisting of 7-cis-(3-chloro-2-propenyl)-1,3,5,7-tetraazabicyclo(3.3.1)nonane-3-methanol and 7-cis-trans-(3-chloro-2-propenyl)-1,3,5,7-tetraazabicyclo(3.3.1)nonane-3methanol.

2. 7-Cis-(3-chloro-2-propenyl)-1,3,5,7-tetraazabicyclo-(3.3.1)nonane-3-methanol.

3. 7-Cis-trans-(3-chloro-2-propenyl)-1,3,5,7-tetraazabicyclo(3.3.1)nonane-3-methanol.

4. A method for making a cis- or a mixture of cis- and trans-7-(3-chloro-2-propenyl)-1,3,5,7-tetraazabicyclo-(3.3.1)nonane-3-methanol which comprises reacting at room temperature cis- or cis-trans- 1-(3-chloro-2-propenyl)-3,5,7-triaza-1azoniatricyclo(3.3.1.1$^{3,7}$)decane chloride with excess aqueous strong base and recovering the respective product 7-(3-chloro-2-propenyl)-1,3,5,7-tetraazabicyclo-(3.3.1)nonane-3-methanol from the reaction medium.

* * * * *

PO-1050
(5/69)

UNITED STATES PATENT OFFICE
CERTIFICATE OF CORRECTION

Patent No. 3,862,939                Dated   January 28, 1975

Inventor(s)   Thomas P. Brady

It is certified that error appears in the above-identified patent and that said Letters Patent are hereby corrected as shown below:

The title, first and second occurrence, pages 1 and 2, should read "7-(3-CHLORO-2-PROPENYL)-1,3,5,7-TETRAAZA-BICYCLO(3.3.1)NONANE-3-METHANOL AND ITS PREPARATION" instead of "3-(3" etc.

Column 1, lines 25 and 27, immediately following the trademark "Dowicil" there should be inserted the omitted trademark symbol --®--.

Column 1, in the paragraph heading "DESCRIPTION OF THE EMBODIMENTS" the word "PREFERRED" was omitted and the heading should read --DESCRIPTION OF THE PREFERRED EMBODIMENTS--.

Column 2, line 23, immediately following the trademark "Dowicil" there should be inserted the omitted trademark symbol --®--.

Column 2, line 63, there is omitted a bond between the "1" and "azoniatricylco" and the line should read --3,5,7-triaza-1-azoniatricyclo(3.3.1.1$^{3,7}$)decane chloride--.

Signed and sealed this 20th day of May 1975.

(SEAL)
Attest:

RUTH C. MASON
Attesting Officer

C. MARSHALL DANN
Commissioner of Patents
and Trademarks